(12) United States Patent
Simons et al.

(10) Patent No.: US 6,952,508 B2
(45) Date of Patent: Oct. 4, 2005

(54) LOW-PROFILE BACK PLANE INTERCONNECTION DEVICE

(75) Inventors: Richard Simons, Cambridgeshire (GB); Christoper M. Warnes, Suffolk (GB)

(73) Assignee: Stratos International, Inc., Chicago, IL (US)

( * ) Notice: Subject to any disclaimer, the term of this patent is extended or adjusted under 35 U.S.C. 154(b) by 103 days.

(21) Appl. No.: 10/653,175

(22) Filed: Sep. 3, 2003

(65) Prior Publication Data

US 2005/0047717 A1    Mar. 3, 2005

(51) Int. Cl.[7] ............................................... G02B 6/26
(52) U.S. Cl. ........................... 385/31; 385/52; 385/18; 385/50
(58) Field of Search .............................. 385/31, 14, 15, 385/16, 18, 33, 47, 50, 52

(56) References Cited

U.S. PATENT DOCUMENTS

| | | | |
|---|---|---|---|
| 5,193,132 A * | 3/1993 | Uken et al. ................... 385/32 |
| 5,999,670 A * | 12/1999 | Yoshimura et al. ........... 385/31 |
| 6,510,260 B2 * | 1/2003 | Chen et al. .................... 385/17 |
| 6,516,105 B1 | 2/2003 | Khusid et al. ................ 385/15 |
| 6,516,111 B1 * | 2/2003 | Jurbergs et al. ............... 385/18 |
| 6,647,170 B2 * | 11/2003 | Hsu ............................. 385/17 |
| 2003/0010905 A1 * | 1/2003 | Luo ....................... 250/227.11 |
| 2004/0114859 A1 * | 6/2004 | Colgan et al. ................ 385/31 |
| 2004/0218848 A1 * | 11/2004 | Shen et al. .................... 385/14 |

\* cited by examiner

*Primary Examiner*—Kianni C. Kaveh
(74) *Attorney, Agent, or Firm*—Karl D. Kovach

(57) ABSTRACT

The low-profile back plane interconnection device includes a back plane, a daughter card, and a shroud. The back plane includes an optical fiber. The optical fiber of the back plane includes a terminal end. The terminal end of the optical fiber of the back plane has a terminal surface that is oriented at an angle relative to the longitudinal length direction of the optical fiber of the back plane. The shroud is mounted to the daughter card. The shroud includes an optical fiber, and a lens. The optical fiber of the shroud has a terminal end. The terminal end of the optical fiber of the shroud is in optical communication with the terminal end of the optical fiber of the back plane via the lens.

5 Claims, 5 Drawing Sheets

LOW-PROFILE BACK PLANE INTERCONNECTION DEVICE

BACKGROUND OF THE INVENTION

1. Field of the Invention

The present invention pertains to back plane interconnection devices. The invention more particularly concerns a back plane interconnection device having optical fibers or waveguides so as to provide a low-profile.

2. Discussion of the Background

Optical connections between optical fibers or waveguides of an optical back plane and optical fibers or waveguides of an optical daughter card are known in the art. Two connection techniques are known in the art for connecting the optical back plane to the optical daughter card.

The first technique requires that the optical fibers or waveguides of the back plane be terminated in some manner as with a standard size ferrule. The optical fibers or waveguides of the daughter card are also terminated in some manner, such as with a standard size ferrule. Then a corresponding pair of ferrules, one from the back plane and the other from the daughter card, are brought together, and held together, so as to be in optical communication with one another, by way of an adapter housing or other similar structure.

The second technique requires that the optical fibers or waveguides of the back plane be terminated by exposing the bare terminal ends of the optical fibers or waveguides which are stripped of any insulating material. The optical fibers or waveguides of the daughter card are also terminated by exposing the bare terminal ends of the optical fibers or waveguides which are stripped of any insulating material. Then a corresponding pair of exposed ends are brought together so as to contact one another. The pair of exposed ends are then subject to high heat so as to fuse the two exposed ends to one another. The corresponding pair of optical fibers or waveguides are then in optical communication with one another.

The known techniques require a significant amount of skilled labor to perform the processes described above, and the resulting devices are large and bulky.

SUMMARY OF THE INVENTION

It is an object of the invention to provide a back plane interconnection device that facilitates the connection of an optical back plane to an optical card.

It is a further object of the invention to provide a back plane interconnection device that is compact and has a low-profile.

In one form of the invention the device includes a back plane, and a shroud. The back plane includes an optical fiber. The optical fiber of the back plane includes a terminal end. The terminal end of the optical fiber of the back plane has a terminal surface that is oriented at an angle relative to the longitudinal length direction of the optical fiber of the back plane. The shroud includes an optical fiber. The optical fiber of the shroud has a terminal end. The terminal end of the optical fiber of the shroud is in optical communication with the terminal end of the optical fiber of the back plane.

In another form of the invention, the device contains the features described above and further includes a lens as part of the shroud. The terminal end of the optical fiber of the shroud is in optical communication with the lens. The lens is in optical communication with the terminal end of the optical fiber of the back plane.

In operation, when a first light signal is transmitted from the optical fiber of the shroud to the optical fiber of the back plane, the first light signal exits the terminal end of the optical fiber of the shroud and impinges a surface of the optical fiber of the back plane adjacent to the terminal end of the optical fiber of the back plane. Then the first light signal enters the optical fiber of the back plane and, due to total internal reflection, is reflected off of the terminal surface of the optical fiber of the back plane so that the first light signal travels along the longitudinal length direction of the optical fiber of the back plane away from the terminal end of the optical fiber of the back plane.

In operation, when a second light signal is transmitted from the optical fiber of the back plane to the optical fiber of the shroud, the second light signal travels through the optical fiber of the back plane toward the terminal end of the of the optical fiber of the back plane. Then the second light signal is, due to total internal reflection, reflected off of the terminal surface of the optical fiber of the back plane and then exits the surface of the optical fiber of the back plane adjacent to the terminal end of the optical fiber of the back plane. Then the second light signal enters the optical fiber of the shroud through the terminal end of the optical fiber of the shroud.

In operation, when a light signal is transmitted from the optical fiber of the shroud to the optical fiber of the back plane, the light signal exits the terminal end of the optical fiber of the shroud and impinges a surface of the optical fiber of the back plane adjacent to the terminal end of the optical fiber of the back plane. Then, the light signal enters the optical fiber of the back plane and, due to total internal reflection, is reflected off of the terminal surface of the optical fiber of the back plane so that the light signal travels along the longitudinal length direction of the optical fiber of the back plane away from the terminal end of the optical fiber of the back plane.

In operation, when a light signal is transmitted from the optical fiber of the back plane to the optical fiber of the shroud, the light signal travels through the optical fiber of the back plane toward the terminal end of the of the optical fiber of the back plane. The light signal is then, due to total internal reflection, reflected off of the terminal surface of the optical fiber of the back plane and then exits the surface of the optical fiber of the back plane adjacent to the terminal end of the optical fiber of the back plane. Then, the light signal enters the optical fiber of the shroud through the terminal end of the optical fiber of the shroud.

In another form of the invention, the device contains the features described above and further includes the features of the angle of the terminal end of the optical fiber of the back plane being equal to forty-five degrees, and the terminal surface of the terminal end of the optical fiber of the back plane being metallized. Also, a daughter card is included to which the shroud is mounted. Furthermore, a longitudinal length direction of the optical fiber of the shroud is substantially perpendicular to the longitudinal length direction of the optical fiber of the back plane.

Thus, the invention achieves the objectives set forth above. The invention provides a device which is compact, has a low-profile, and facilitates the optical connection of an optical back plane to an optical card.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
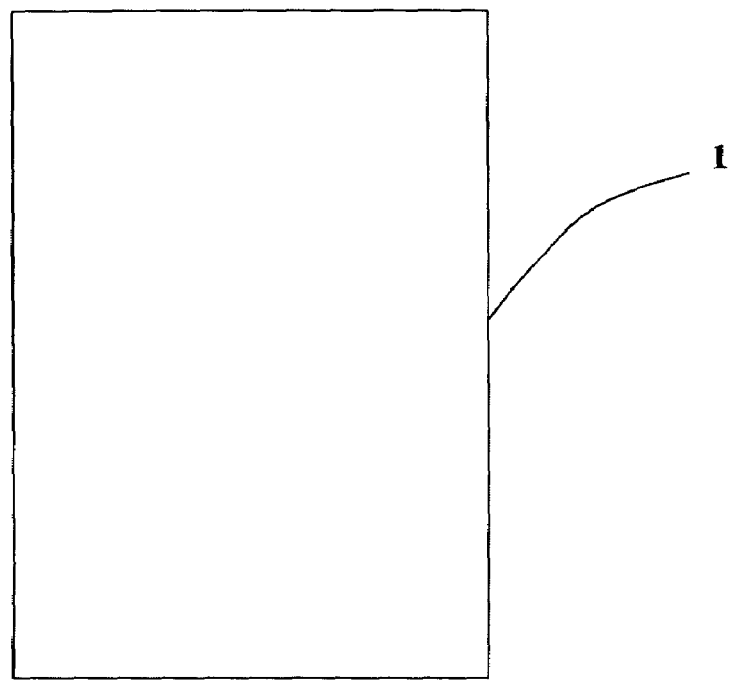
FIG. 1 is a front view of a back plane.

Referring now to the drawings, wherein like reference numerals designate identical or corresponding parts throughout the several views, and more particularly to FIGS. 6–10 thereof, an embodiment of the present invention is a device or low-profile back plane interconnection device 100 which is displayed therein. FIGS. 1–5 display individual components or subassemblies of components that are specifically arranged to form the device 100.

FIG. 1 is a front view of a back plane 1. Specifically, back plane 1 is an optical back plane. Back plane 1 has waveguides or optical fibers either adhered to a surface of a substrate, or has optical fibers sandwiched between two substrates, or includes a polymer or other material molded around optical fibers. The substrates are typically made of non-conuctive or insulative materials such as mylar or other suitable polymer materials. In this application, waveguides and optical fibers can be used interchangeably, however, the term optical fibers is used in the remainders of this discussion. Additionally, the back plane 1 may include electrical conductors and other components.

Figure 2:
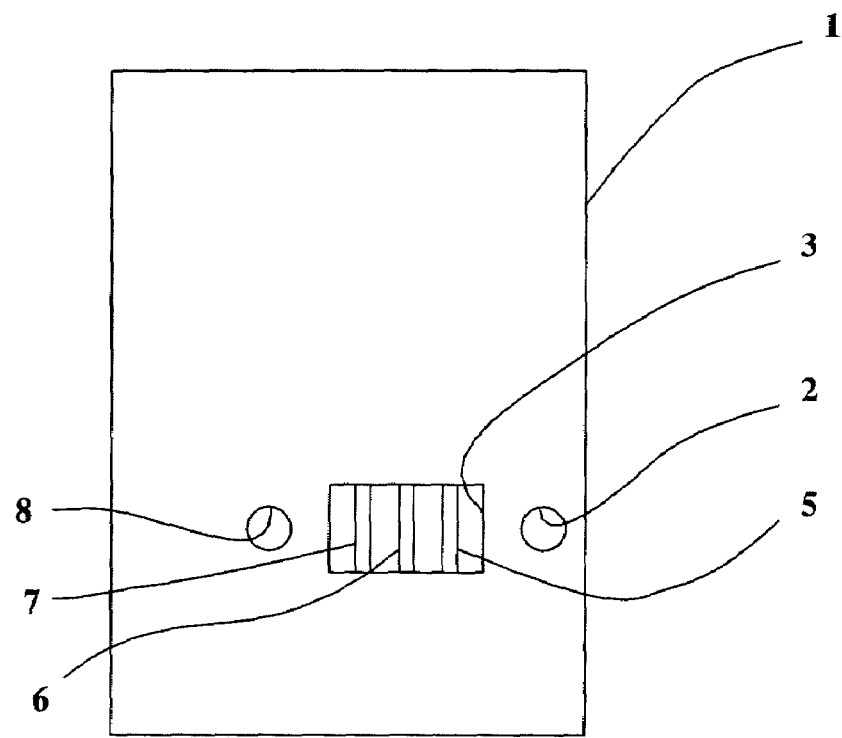
FIG. 2 is a front view of the back plane of FIG. 1 having an aperture formed though the thickness of the back plane so as to expose some optical fibers and also shown are alignment pin apertures formed through the thickness of the back plane.

FIG. 2 is a front view of the back plane 1 showing three apertures 2, 3, and 8 formed in the back plane 1. Apertures 2 and 8 are alignment pin apertures 2, 8. Alignment pin apertures 2, 8 accept alignment pins 25, 26 (see FIGS. 5 and 8) so as to align various components of the device 100. Aperture 3 is formed in the back plane 1 so as to expose optical fibers 5, 6, and 7. The optical fibers 5, 6, and 7 are precisely spaced and aligned relative to one another and relative to the alignment pin apertures 2, 8. Methods of forming apertures in an optical back plane are well known in the art and are not further discussed.

Figure 3:
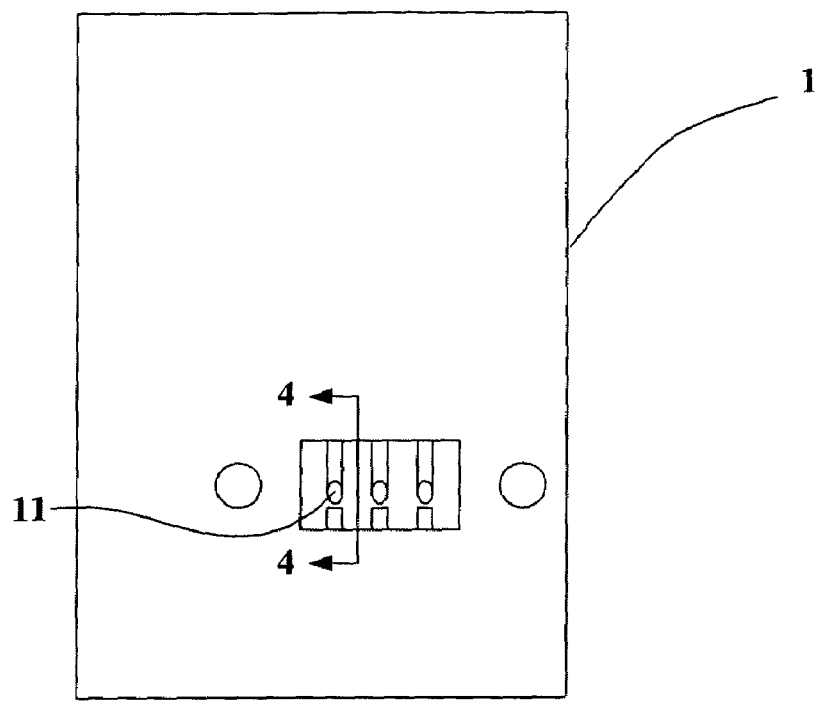
FIG. 3 is a front view of the back plane of FIG. 2 showing the terminated optical fibers.

FIG. 3 is a front view of the back plane 1 of FIG. 2 showing optical fibers 5, 6, and 7, which have been terminated. The terminated end of optical fiber 7 has a terminated surface 11. The terminated surface 11 is cut, cleaved, or fractured at an angle which is preferably set at forty-five degrees relative to the longitudinal length direction of the optical fiber 7. Furthermore, the terminated surface 11 can be metallized, which entails coating the terminated surface 11 with a metallic material. The metallized surface provides for protection and enhanced performance of the terminated surface 11. Methods of terminating optical fibers and methods of metallizing surfaces of optical fibers are well known in the art and are not further discussed.

Figure 4:
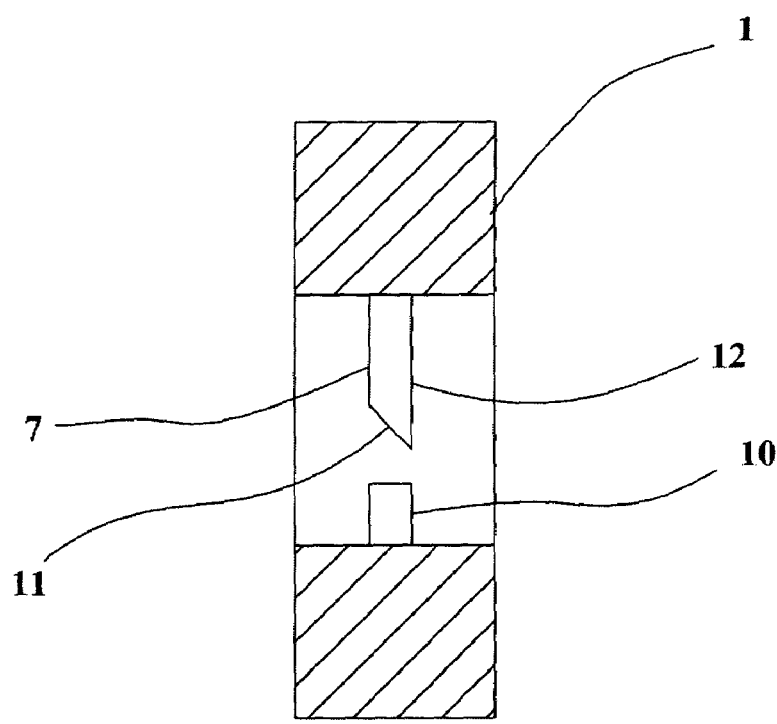
FIG. 4 is an expanded, partial cross-section view of the back plane taken along section line 4—4 of FIG. 3.

FIG. 4 is an expanded, partial cross-section view of the back plane 1 taken along section line 4—4 of FIG. 3. The optical fiber 7 is terminated which results in a first half 12 and a second half 10 of the optical fiber 7. The terminal end of the first half 12 of the optical fiber 7 is provided with the terminal surface 11. The angle at which the terminal surface 11 is formed relative to the longitudinal length direction of the optical fiber 7 is readily apparent. Optical fibers 5 and 6 are terminated in a manner similar to that of optical fiber 7, however, for reasons of clarity, only optical fiber 7 is discussed in detail.

Figure 5:
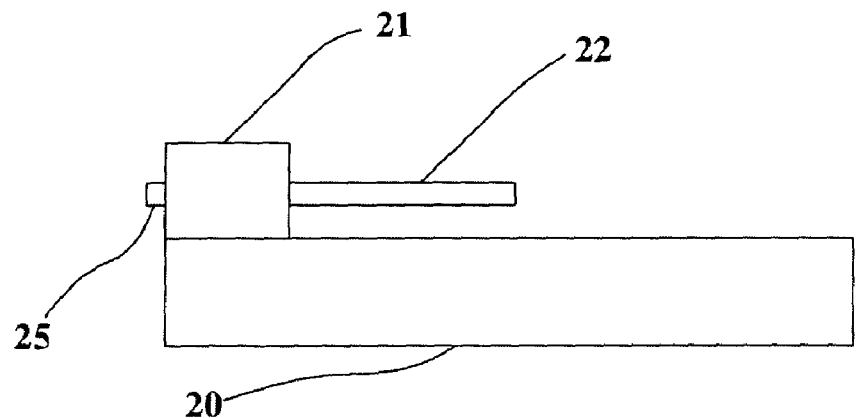
FIG. 5 is a side view of a daughter card and shroud.

FIG. 5 is a side view of a daughter card 20 and shroud 21. The shroud 21 includes optical fiber 22, 23, and 24, associated lenses (not shown), and alignment pins 25, 26. The optical fibers 22, 23, and 24 can be assembled into preexisting apertures in the shroud 21, or the shroud 21 can be formed of two pieces which trap the optical fibers 22, 23, and 24 between the two pieces, or the shroud 21 can be molded around the optical fibers 22, 23, and 24.

Likewise, the alignment pins 25, 26 are similarly attached to the shroud 21, or can be integrally molded as part of the body of the shroud 21. The alignment pins 25, 26 are precisely located relative to the optical fibers 22, 23, and 24. Similarly, the optical fibers 22, 23, and 24 are precisely located relative to one another. The shroud is preferably made from a suitable engineering material, typically a polymer. The alignment pins, typically, are made of a metallic material. The optical fibers 22, 23, and 24 are made of optically transparent material.

The shroud 21 is mounted to the daughter card 20. In practice, one set of ends of the optical fibers 22, 23, and 24 connect to optical or optoelectronic devices (not shown) mounted on the daughter card 20. Any conventional means of mounting the shroud 21 to the daughter card may be employed. Three optical fiber 22, 23, and 24 are shown in this example, however, any number of optical fibers may be utilized.

Figure 6:
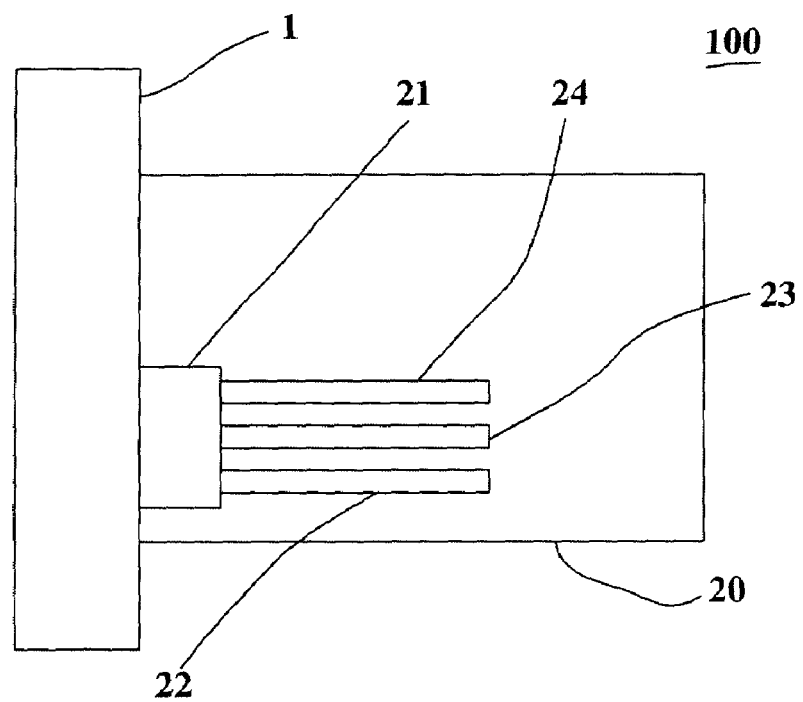
FIG. 6 is a top view of the interconnection device showing the back plane of FIG. 3, and the daughter card and the shroud of FIG. 5.

FIG. 6 is a top view of the device 100 showing the back plane 1 of FIG. 3, and the daughter card 20 and the shroud 21 of FIG. 5. The daughter card 20 and shroud 21 are mounted to the back plane 1. The alignment pins 25, 26 of the shroud 21 have a shape which is complimentary to the shape of the alignment pin apertures 2, 8 of the back plane 1. Thus, the alignment pins 25, 26, and the alignment pin apertures 2, 8 ensure that the optical fibers 22, 23, and 24 are properly aligned with the optical fibers 5, 6, and 7 of the back plane 1.

Figure 7:
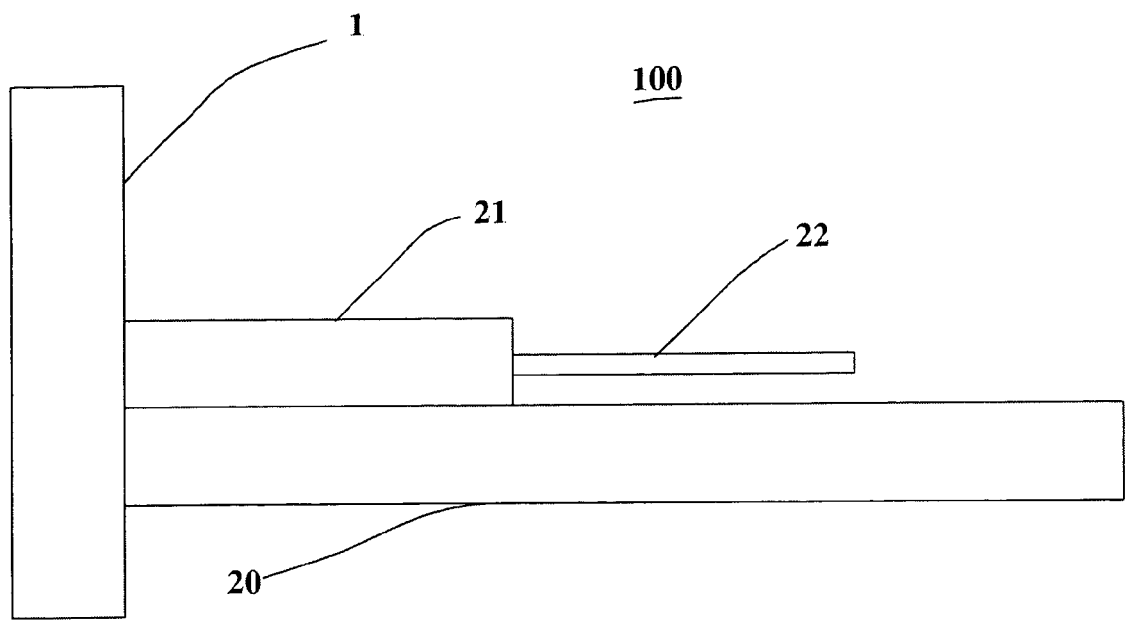
FIG. 7 is a side view of the interconnection device of FIG. 6.

FIG. 7 is a side view of the device 100 of FIG. 6. The low-profile of the interconnection between the back plane 1 and the daughter card 20 is evident in such a perspective of the device 100. The daughter card 20/shroud 21 assembly can be attached to the back plane 1 by methods and materials known in the art.

Figure 8:
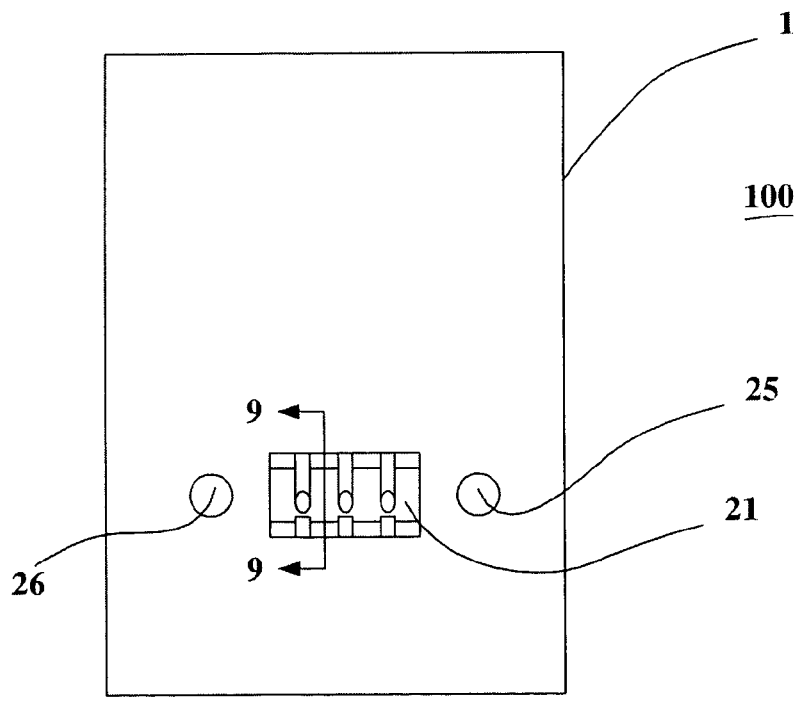
FIG. 8 is a front view of the interconnection device of FIG. 7.

FIG. 8 is a front view of the device 100. The alignment pins 25, 26 of the shroud 21 are slid into the respective alignment pin apertures 2, 8 of the back plane 1 so as to properly align the shroud 21 and daughter card 20 relative to the back plane 1. Proper alignment of the components ensures that the optical fiber 22, 23, 24 of the shroud 21 will be in optical communication with the respective optical fibers 5, 6, 7 of the back plane 1.

Figure 9:
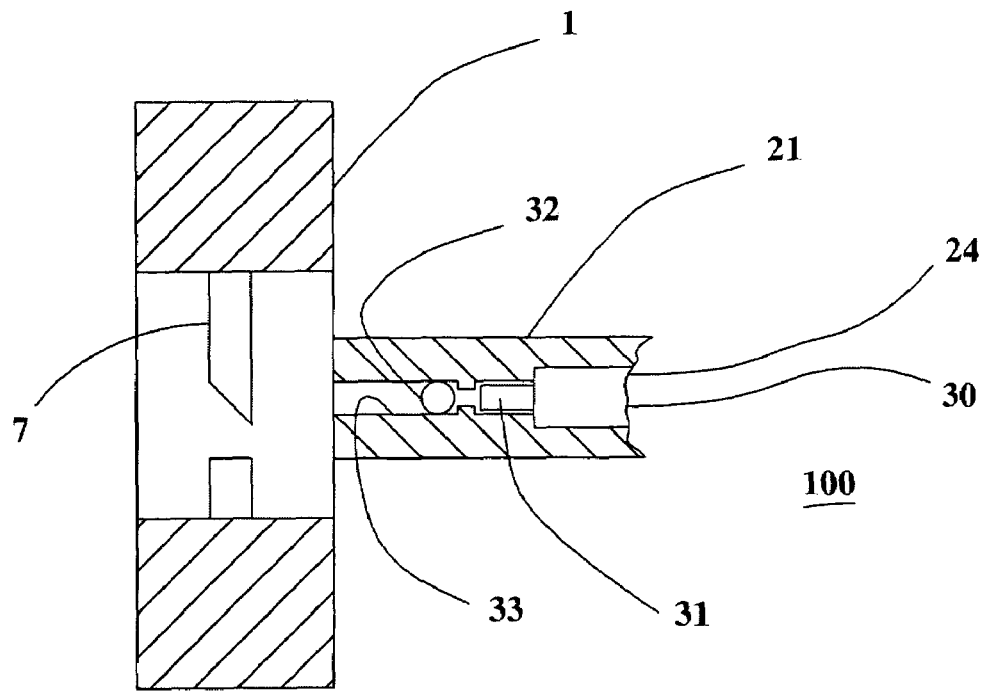
FIG. 9 is an expanded, partial, cross-section view of the interconnection device taken along section line 9—9 of FIG. 8.

FIG. 9 is an expanded, partial, cross-section view of the device 100 taken along section line 9—9 of FIG. 8. Positioned inside a lens retaining aperture 33 of the shroud 21 is a lens 32. The lens 32 may be further retained within the lens retaining aperture 33 with an adhesive material that is optically transparent and has an index of refraction that is substantially similar to an index of refraction of the material that from which the lens 32 is constructed. Optical fiber 24 is shown with an outer coat 30 and a substantially optically transparent material region 31 at a terminal end of the optical fiber 24 of the shroud 21. The terminal end of the optical fiber 24 of the shroud 21 is in optical communication with the lens 32. The terminal end of the optical fiber 7 of the back plane 1 is in optical communication with the lens 32. Thus, the terminal end of the optical fiber 24 of the shroud 21 is in optical communication with a terminal end of the optical fiber 7 of the back plane 1.

Figure 10:
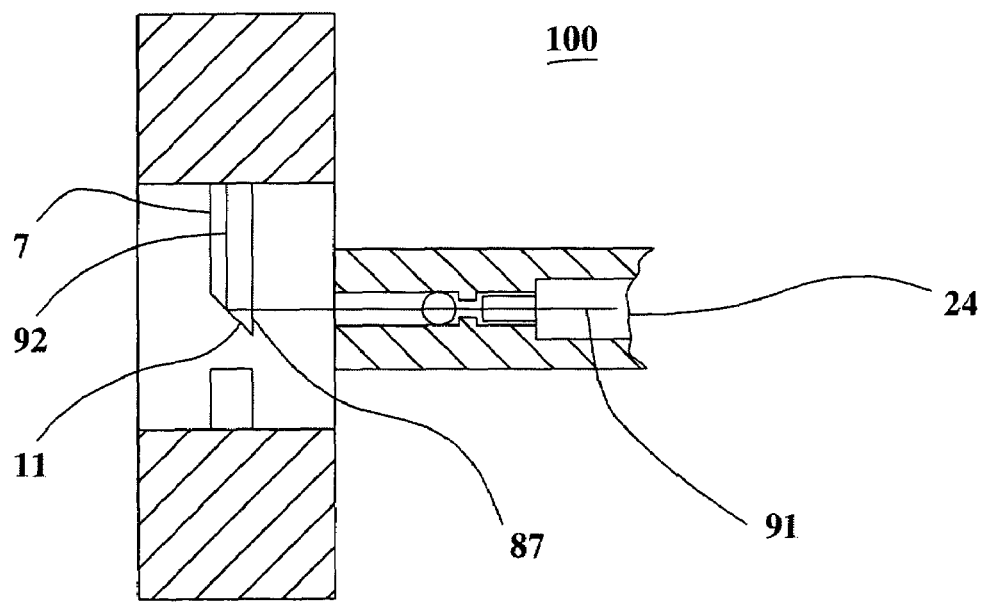
FIG. 10 is an exploded, partial, cross-section view of the interconnection device of FIG. 9 showing the path of a light signal.

FIG. 10 is an exploded, partial, cross-section view of the device 100 of FIG. 9 showing the path of a light signal. By way of example, in operation, when a first light signal is transmitted from the optical fiber 24 of the shroud 21 to the optical fiber 7 of the back plane 1, the first light signal exits the terminal end of the optical fiber 24 of the shroud 21 and enters and exits the lens 32. The first light signal then impinges a surface 87 of the optical fiber 7 of the back plane 1 adjacent to the terminal end of the optical fiber 7 of the back plane 1. The path or ray of a first portion of the first light signal is denoted by numeral designator 91. The first light signal then enters the optical fiber 7 of the back plane 1 and, due to total internal reflection, is reflected off of the terminal surface 11 of the optical fiber 7 of the back plane 1 so that the first light signal travels along the longitudinal length direction of the optical fiber 7 of the back plane 1 away from the terminal end of the optical fiber 7 of the back plane 1. The path or ray of a second portion of the first light signal is denoted by numeral designator 92. The lens 32 can be used to focus the first light signal from the terminal end of the optical fiber 24 of the shroud 21 through the cladding of the optical fiber 7 and onto the terminal surface 11 of the optical fiber 7 of the back plane 1.

Also by way of example, in a direction of propagation opposite to the first light signal, in operation, when a second light signal is transmitted from the optical fiber 7 of the back plane 1 to the optical fiber 24 of the shroud 21, the second light signal travels through the optical fiber 7 of the back plane 1 toward the terminal end of the of the optical fiber 7 of the back plane 1. The path or ray of a first portion of the second light signal is denoted by numeral designator 92. Then the second light signal is, due to total internal reflection, reflected off of the terminal surface 11 of the optical fiber 7 of the back plane 1 and then exits the surface 87 of the optical fiber 7 of the back plane 1 adjacent to the terminal end of the optical fiber 7 of the back plane 1. Then the second light signal enters and exits the lens 32, the second light signal then enters the optical fiber 24 of the shroud 21 through the terminal end of the optical fiber 24 of the shroud 21. The lens 32 can be used to collimate the second light signal from the optical fiber 7 of the back plane 1 onto the terminal end of the optical fiber 24 of the shroud.

Obviously, numerous modifications and variations of the present invention are possible in light of the above teachings. It is therefore to be understood that within the scope of appended claims, the invention may be practiced otherwise than as specifically described herein.

What is claimed is:

1. A device comprising:
    a back plane having an optical fiber, the optical fiber of the back plane having a terminal end, the terminal end of the optical fiber of the back plane having a terminal surface oriented at an angle relative to a longitudinal length direction of the optical fiber of the back plane, and wherein the angle is substantially forty-five degrees, and wherein the terminal surface of the optical fiber of the back plane is metallized;
    a daughter card; and
    a shroud mounted to the daughter card, the shroud having an optical fiber and a lens, the optical fiber of the shroud having a terminal end, and wherein a longitudinal length direction of the optical fiber of the shroud is substantially perpendicular to the longitudinal length direction of the optical fiber of the back plane, and wherein the terminal end of the optical fiber of the shroud is in optical communication with the lens, and wherein the lens is in optical communication with the terminal end of the optical fiber of the back plane, and wherein,
    when a first light signal is transmitted from the optical fiber of the shroud to the optical fiber of the back plane, the first light signal exits the terminal end of the optical fiber of the shroud and enters and exits the lens, the first light signal then impinges a surface of the optical fiber of the back plane adjacent to the terminal end of the optical fiber of the back plane, the first light signal then enters the optical fiber of the back plane and, due to total internal reflection, is reflected off of the terminal surface of the optical fiber of the back plane so that the first light signal travels along the longitudinal length direction of the optical fiber of the back plane away from the terminal end of the optical fiber of the back plane, and wherein,
    when a second light signal is transmitted from the optical fiber of the back plane to the optical fiber of the shroud, the second light signal travels through the optical fiber of the back plane toward the terminal end of the of the optical fiber of the back plane, the second light signal is then, due to total internal reflection, reflected off of the terminal surface of the optical fiber of the back plane and then exits the surface of the optical fiber of the back plane adjacent to the terminal end of the optical fiber of the back plane, the second light signal then enters and exits the lens, the second light signal then enters the optical fiber of the shroud through the terminal end of the optical fiber of the shroud.

2. A device according to claim 1 wherein the shroud contacts the back plane.

3. A device according to claim 2 wherein the back plane includes a first alignment pin aperture and a second alignment pin aperture.

4. A device according to claim 3 wherein the shroud includes a first alignment pin and a second alignment pin, and wherein the first alignment pin aperture of the back plane has a shape complementary to a shape of the first alignment pin of the shroud, and wherein the second alignment pin aperture of the back plane has a shape complementary to a shape of the second alignment pin of the shroud.

5. A device according to claim 4, further comprising an adhesive material which secures the lens to the shroud, and wherein the adhesive material has an index of refraction which is substantially the same as an index of refraction of a material of the lens.

* * * * *